(12) United States Patent
Mochizuki et al.

(10) Patent No.: US 12,227,094 B2
(45) Date of Patent: Feb. 18, 2025

(54) CONNECTOR AND POWER SUPPLY DEVICE

(71) Applicant: KYB Corporation, Tokyo (JP)

(72) Inventors: Takahisa Mochizuki, Tokyo (JP); Takuhiro Kondo, Tokyo (JP)

(73) Assignee: KYB CORPORATION, Tokyo (JP)

( * ) Notice: Subject to any disclaimer, the term of this patent is extended or adjusted under 35 U.S.C. 154(b) by 532 days.

(21) Appl. No.: 17/601,162

(22) PCT Filed: Mar. 25, 2020

(86) PCT No.: PCT/JP2020/013244
§ 371 (c)(1),
(2) Date: Oct. 4, 2021

(87) PCT Pub. No.: WO2020/209062
PCT Pub. Date: Oct. 15, 2020

(65) Prior Publication Data
US 2022/0176836 A1 Jun. 9, 2022

(30) Foreign Application Priority Data

Apr. 10, 2019 (JP) .................. 2019-074480

(51) Int. Cl.
*B60L 53/16* (2019.01)
*B60G 17/052* (2006.01)
(Continued)

(52) U.S. Cl.
CPC ............ *B60L 53/16* (2019.02); *B60G 17/052* (2013.01); *B60L 53/30* (2019.02); *H01R 13/005* (2013.01)

(58) Field of Classification Search
CPC ...... H01R 13/005; H01R 27/00; H01R 27/02; H01R 29/00; H01R 25/00; H01R 25/006;
(Continued)

(56) References Cited

U.S. PATENT DOCUMENTS 5,906,500 A 5/1999 Kakuta et al.
6,464,520 B2 * 10/2002 Saba .................... H01R 13/641
439/654
(Continued)

FOREIGN PATENT DOCUMENTS

EP 0800234 A1 * 3/1997 .......... H01R 13/005
JP H10-112349 A 4/1998
(Continued)

OTHER PUBLICATIONS

EP 0800234 A1, including machine translation.*
(Continued)

*Primary Examiner* — Renee S Luebke
*Assistant Examiner* — Paul D Baillargeon
(74) *Attorney, Agent, or Firm* — Smith, Gambrell & Russell, LLP (57) ABSTRACT

Provided is a configuration capable of supplying compressed air to a pneumatic apparatus while supplying electric power to an electric vehicle. A connector is connected to a vehicle provided with an air suspension device to which compressed air is supplied, and supplies electric power supplied from an electric power supply unit to the vehicle. The connector includes a charging connection portion that supplies electric power to the vehicle, and an air supply connection portion that supplies compressed air to the air suspension device.

11 Claims, 5 Drawing Sheets

(51) Int. Cl.
  *B60L 53/30* (2019.01)
  *H01R 13/00* (2006.01)
(58) Field of Classification Search
  CPC .... H01R 31/00; H01R 31/06; H01R 2201/26; B60L 53/16; B60L 53/30; B60G 17/052; F04B 35/06; F04B 41/02; F04B 17/06
  See application file for complete search history.

(56) References Cited

U.S. PATENT DOCUMENTS

| | | | |
|---|---|---|---|
| 8,098,044 | B2 | 1/2012 | Taguchi |
| 8,894,428 | B2 * | 11/2014 | Cecchinelli ............. F16L 25/01 |
| | | | 439/680 |
| 2009/0256523 | A1 | 10/2009 | Taguchi |
| 2015/0298520 | A1 | 10/2015 | Hayes et al. |
| 2019/0248439 | A1 | 8/2019 | Wang |
| 2019/0263281 | A1 | 8/2019 | Wang |

FOREIGN PATENT DOCUMENTS

| | | |
|---|---|---|
| JP | 2008-092624 A | 4/2008 |
| JP | 2009-298170 A | 12/2009 |
| JP | 2013-241084 A | 12/2013 |
| WO | 2017/217929 A1 | 12/2017 |

OTHER PUBLICATIONS

International Search Report for PCT/JP2020/013244, dated Jun. 9, 2020 (4 pgs. with English translation).
Chinese Office Action mailed May 20, 2023 in Chinese Patent Application No. 202080027693.7 (4 pages in Chinese with English machine translation).
Written Opinion of the International Searching Authority mailed Jun. 9, 2020 for International Patent Application No. PCT/JP2020/013244 (4 pages in Japanese with English Translation).

* cited by examiner

CONNECTOR AND POWER SUPPLY DEVICE

TECHNICAL FIELD

The present invention relates to a connector and a power supply device.

BACKGROUND ART

Conventionally, a configuration in which an air suspension device is mounted on a vehicle is known. For example, an air suspension device of Patent Literature 1 includes a pair of air springs interposed between a vehicle body and an axle to elastically support the vehicle body. The air spring has an air chamber including a piston, a diaphragm, and the like. Then, when compressed air is supplied into the air chamber so that the pressure of the air chamber is increased, the vehicle body can be raised, and conversely, when air in the air chamber is exhausted so that the pressure of the air chamber is decreased, the vehicle body can be lowered. In this manner, the vehicle height is adjusted by controlling the pressure in the air chamber.

CITATION LIST

Patent Literature

Patent Literature 1: JP 2009-298170 A

SUMMARY OF INVENTION

Technical Problems

In the air suspension device of Patent Literature 1, a compressor mounted on a vehicle is used for supplying compressed air into an air chamber. When the compressor is thus mounted on the vehicle, there is a problem that the weight of the vehicle increases. In view of such a problem, such a configuration is also conceivable that a compressor is not mounted on a vehicle but compressed air is supplied from the outside of the vehicle using a compressor at predetermined timing (for example, at the time of charging a battery, or the like). However, in such a configuration, an operation of connecting the compressor to the vehicle is required together with an operation of charging the battery, thus requiring much time and effort.

The present invention has been made in view of the above conventional circumstances, and an object thereof to be achieved is to provide a connector and a power supply device capable of supplying compressed air to a pneumatic apparatus while supplying electric power to an electric vehicle.

Solution to Problems

A connector of the present invention is connected to an electric vehicle including a pneumatic apparatus to which compressed air is supplied, and supplies electric power supplied from an electric power supply unit to the electric vehicle. The connector includes a charging connection portion and an air supply connection portion. The charging connection portion supplies electric power to the electric vehicle. The air supply connection portion supplies compressed air to the pneumatic apparatus.

DESCRIPTION OF EMBODIMENTS

Embodiments in which a connector and a power supply device of the present invention are embodied will be described with reference to the drawings. A power supply device 40 according to the present invention supplies electric power and compressed air to a vehicle 1 using a connector 50. The vehicle 1 is an electric vehicle, and is, for example, a so-called community vehicle whose main purpose of use is short distance travel with a round-trip distance of at most about several tens of kilometers, such as daily commuting and shopping.

First Embodiment

First, the vehicle 1 which is an object to be power fed by the power supply device 40 according to the first embodiment will be described.

Figure 1:
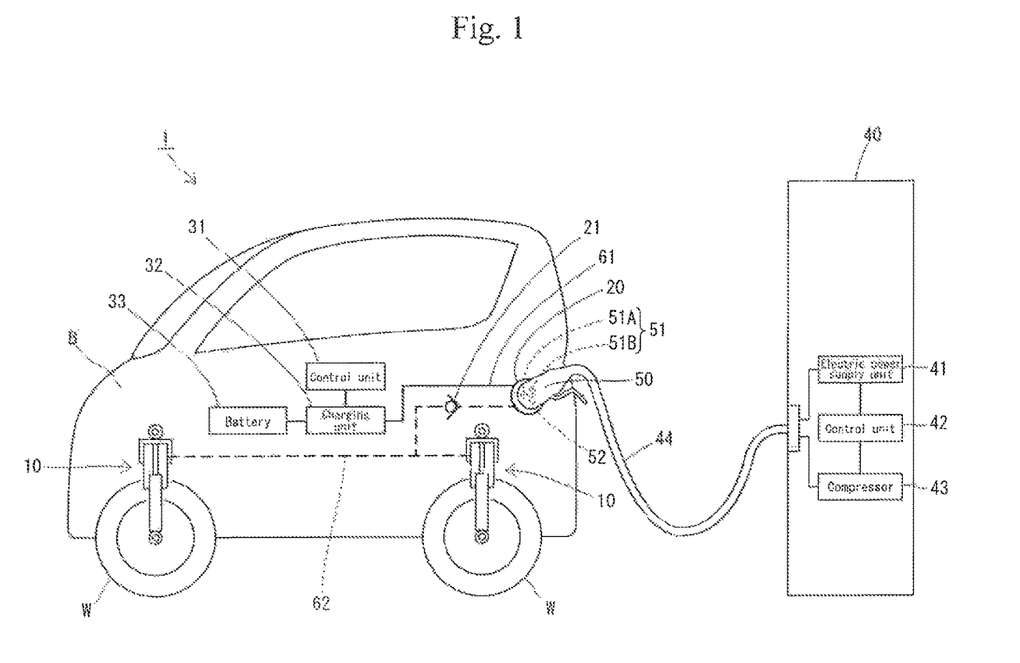
FIG. 1 is a diagram schematically illustrating a state in which a connector of a power supply device according to a first embodiment is connected to a vehicle.

As illustrated in FIG. 1, the vehicle 1 includes a vehicle body B and a plurality of wheels W. The vehicle 1 travels by driving at least any one of the wheels W by a drive unit (not illustrated) having a motor by being supplied with electric power from a battery unit (not illustrated).

Figure 2:
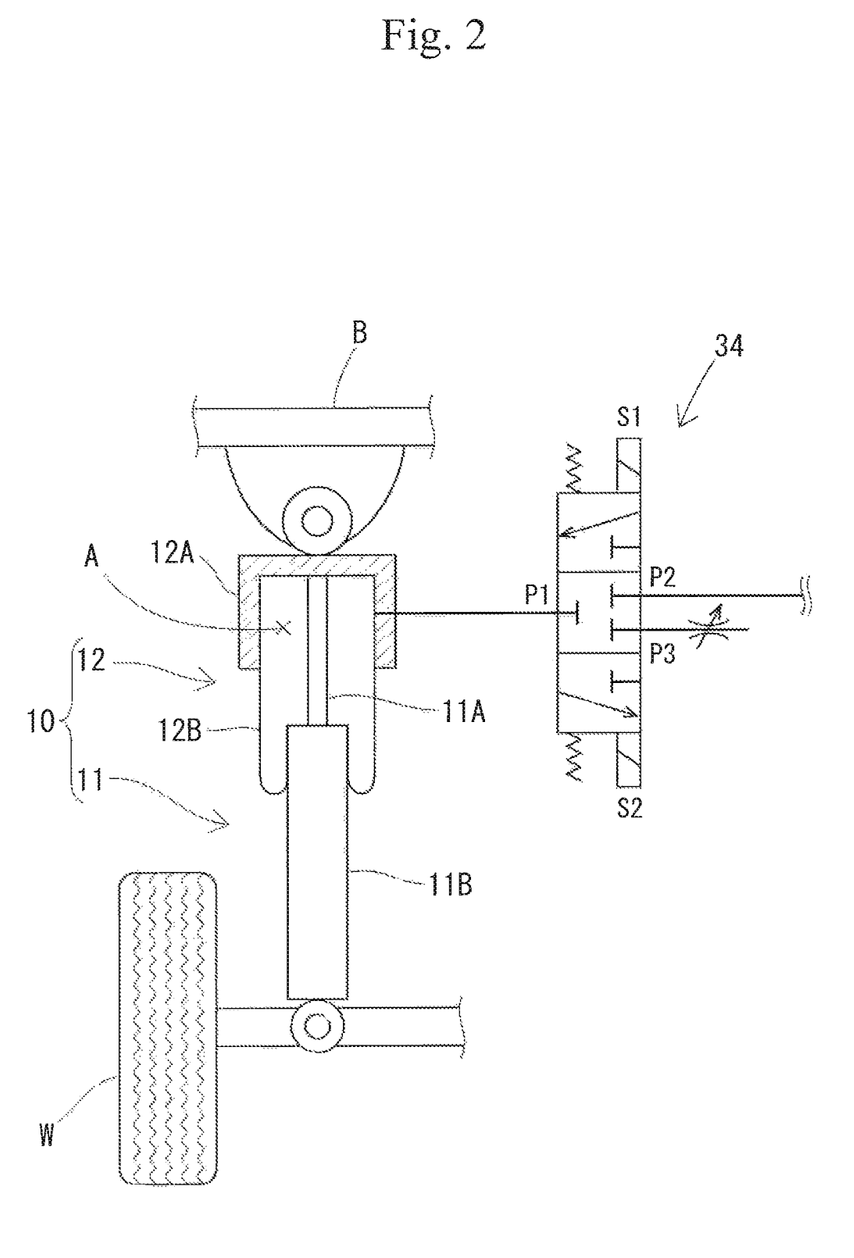
FIG. 2 is a schematic diagram illustrating an air suspension device and an on-off control valve according to the first embodiment.

As illustrated in FIGS. 1 and 2, the vehicle 1 includes an air suspension device 10 (exemplified as a pneumatic apparatus according to the present invention), a terminal 20, a control unit 31, a charging unit 32, a battery 33, and an on-off control valve 34.

The air suspension device 10 is disposed between the vehicle body B and the wheel W. The air suspension device 10 is provided for each of the wheels W. As illustrated in FIG. 2, each air suspension device 10 includes a damper 11 and an air spring 12. The damper 11 is, for example, a hydraulic damper including a rod 11A and a cylinder 11B. The damper 11 is provided so as to be extensible/contractible, and both ends thereof are attached between the vehicle body B and the wheel W. The damper 11 extends/contracts in accordance with a relative movement between the vehicle body B and the wheel W to generate a damping force for suppressing the relative movement.

The air spring 12 functions as a suspension spring that supports a weight of the vehicle body B. As illustrated in FIG. 2, the air spring 12 includes a bottomed cylindrical chamber 12A connected to the rod 11A of the damper 11, and a cylindrical diaphragm 12B connected to the opening of the chamber 12A and the cylinder 11B. In the air spring 12, an air chamber A in which compressed air is enclosed is formed by the chamber 12A and the diaphragm 12B. The compressed air inside the air chamber A is expanded/compressed in response to an impact or vibration input from a road surface, so that the air spring 12 extends/contracts. An extending/contracting direction of the air spring 12 is the same as an extending/contracting direction of the damper 11. The air spring 12 causes elastic repulsive force of the compressed air to act in the extending direction of the damper 11. In addition, the air spring 12 is provided so as to be extensible/contractible to a desired length according to an amount of the compressed air enclosed in the air chamber A. That is, the air suspension device 10 has a vehicle height adjustment function capable of adjusting a vehicle height to a desired height by freely adjusting a distance between the vehicle body B and the wheels W within a predetermined range by extending/contracting the air spring 12.

The terminal 20 supplies electric power to be supplied to the battery 33 from the outside of the vehicle 1, and supplies compressed air to be supplied to the air suspension device 10 from the outside of the vehicle 1. That is, the terminal 20 is a supply port of electric power and compressed air. By connecting the connector 50 to the terminal 20, an electric power supply path 61 from an electric power supply unit 41 to the charging unit 32 is formed, and an air supply path 62 from a compressor 43 to the air suspension device 10 is formed. The terminal 20 includes, for example, a pair of electrodes (not illustrated) corresponding to a charging connection portion 51 (a pair of electrodes 51A and 51B) of the connector 50 described later. In addition, the terminal 20 has an opening (not illustrated) corresponding to a passage portion of a cable 44 described later. That is, the terminal 20 has a connection face on which the pair of electrodes and the opening are arranged in the same arrangement as the charging connection portion 51 and an air supply connection portion 52 illustrated in FIG. 3.

In the air supply path 62, a check valve 21 is connected to the terminal 20. The check valve 21 blocks a flow of compressed air from the air suspension device 10 side. When the connector 50 is connected to the terminal 20, the check valve 21 is opened by pressure on the connector 50 side, and allows compressed air to flow to the air suspension device 10.

The control unit 31 functions to control operations of the charging unit 32, the on-off control valve 34, and the like. The control unit 31 is configured as, for example, a microcomputer, and includes an arithmetic device such as a CPU, a memory such as a ROM or a RAM, and the like. The charging unit 32 includes a known constant voltage circuit or the like. The charging unit 32 performs a charging operation of supplying a charging current to the battery 33 according to the control of the control unit 31. The battery 33 includes, for example, a known power storage means such as a lead battery. The battery 33 is charged based on the electric power supplied from the charging unit 32.

As illustrated in FIG. 2, the on-off control valve 34 is provided between the air suspension device 10 and the terminal 20. The on-off control valve 34 is provided for each of the air suspension devices 10. Each on-off control valve 34 is a three-port, three-position electromagnetic valve having three ports P1, P2, and P3 and two solenoids S1 and S2. The on-off control valve 34 is opened and closed under the control of the control unit 31. In the on-off control valve 34, the air spring 12 is connected to the first port P1, the terminal 20 is connected to the second port P2, and the third port P3 is opened to the atmosphere. In a first energized state in which the solenoid S1, which is one of the two solenoids S1 and S2, is energized, the on-off control valve 34 allows communication between the first port P1 and the second port P2, which enables compressed air to be supplied from the terminal 20 to the air spring 12. In a second energized state in which the solenoid S2, which is the other of the two solenoids S1 and S2, is energized, the on-off control valve 34 allows communication between the first port P1 and the third port P3, which enables the compressed air in the air spring 12 to be discharged to the outside. Further, when not energized, the on-off control valve 34 blocks communication between the first port P1 and the second and third ports P2 and P3.

Next, the power supply device 40 will be described.

The power supply device 40 is configured as a known charging stand for electric vehicle. As illustrated in FIG. 1, the power supply device 40 includes the electric power supply unit 41, a control unit 42, the compressor 43, the cable 44, and the connector 50. The electric power supply unit 41 functions to supply electric power supplied from a commercial electric power source to the vehicle 1 via the cable 44 and the connector 50 described later under the control of the control unit 42, for example.

The control unit 42 functions to control operations of the electric power supply unit 41, compressor 43, and the like. The control unit 42 is configured as, for example, a microcomputer, and includes an arithmetic device such as a CPU, a memory such as a ROM or a RAM, and the like. The compressor 43 is a device that generates compressed air, and is accommodated, for example, in a housing constituting an outer shell of the power supply device 40.

The cable 44 serves to transfer electric power and compressed air from the power supply device 40. The cable 44 includes a portion where the conductive wire is coated with an insulator, and a passage portion communicating with the compressor 43.

Figure 3:
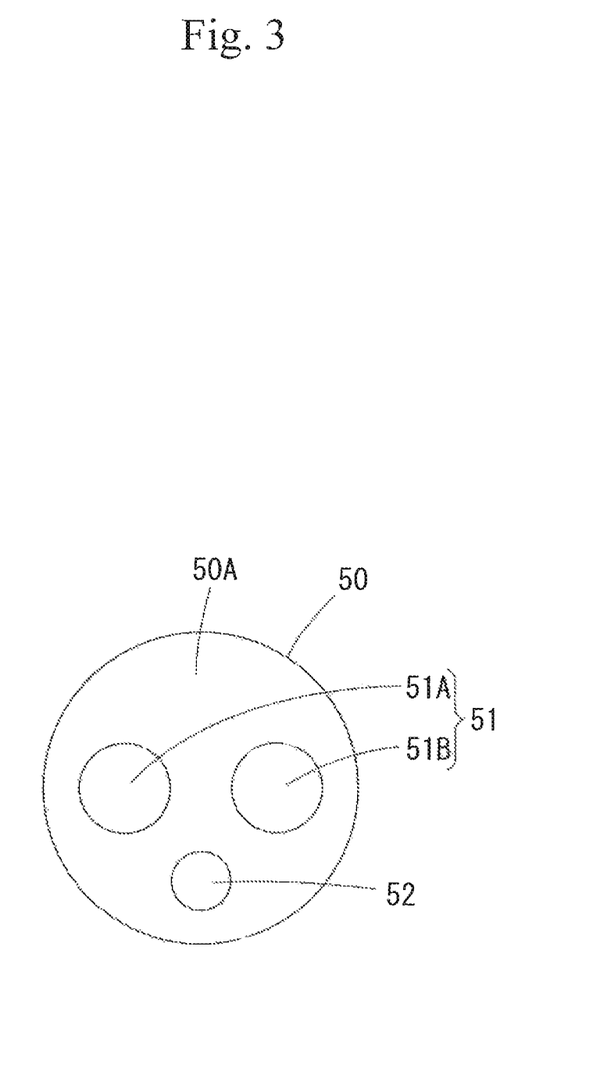
FIG. 3 is a schematic diagram illustrating a connection face of the connector according to the first embodiment.

As illustrated in FIG. 1, the connector 50 is connected to the distal end of the cable 44 and detachably locked to the terminal 20 of the vehicle 1. As illustrated in FIG. 3, the connector 50 includes the charging connection portion 51 and the air supply connection portion 52. The charging connection portion 51 is a portion that supplies electric power to the vehicle 1, and is configured by, for example, the pair of electrodes 51A and 51B electrically connected to the electric power supply unit 41. The air supply connection portion 52 is an opening for supplying compressed air to the air suspension device 10, and communicates with the passage portion of the cable 44. The charging connection portion 51 and the air supply connection portion 52 are formed on a connection face 50A of the connector 50 (a face facing vehicle 1 when the connector 50 is connected to the terminal 20 of the vehicle 1) at substantially the same position in the connecting direction (a direction in which the terminal 20 and the connector 50 face each other).

Next, functions of the connector 50 and the power supply device 40 according to the first embodiment will be described.

Through the use of the connector 50, the power supply device 40 causes the vehicle 1 to take an action of charging the battery 33 and an action of increasing the vehicle height. When the vehicle 1 is used, for example, the vehicle height is adjusted using the air suspension device 10 in order to improve the ride comfort during driving and to improve ease of getting on and off the vehicle for the occupant.

As illustrated in FIG. 1, in the vehicle 1, the connector 50 is connected to the terminal 20. As a result, the power supply device 40 and the vehicle 1 (more specifically, the electric power supply unit 41 and the charging unit 32) are electrically connected, so that the electric power supply path 61 connecting the electric power supply unit 41 and the charging unit 32 is formed. Further, communication between the compressor 43 and the air suspension device 10 is secured, so that the air supply path 62 connecting the compressor 43 and the air suspension device 10 is formed. With such a configuration, in the vehicle 1, the supply of the compressed air to the air suspension device 10 can be performed simultaneously with the charging of the battery 33.

In order to perform supplying the compressed air to the air suspension device 10 and charging the battery 33 simultaneously, it is effective that the power supply device 40 is provided together with a charging facility installed in a highway service area, a gas station, a public parking lot, a storage place of a vehicle such as a home garage, or the like. For example, in rapid charging by the power supply device 40 installed in a highway service area, a gas station, or the like, charging is performed in a relatively short time of 15 minutes to 30 minutes. In such a power supply device 40, the compressor 43 having a relatively large supply amount per unit time is required in accordance with the rapid charging. On the other hand, in normal charging by the power supply device 40 installed in a home garage or the like, charging is usually performed for a long time of 5 hours or more. In such a power supply device 40, the compressor 43 having a relatively small supply amount per unit time may be sufficient.

Here, as described above, since the charging connection portion 51 and the air supply connection portion 52 are formed on the connection face 50A of the connector 50 at substantially the same position in the connecting direction, they are simultaneously connected to the vehicle 1. Therefore, the charging connection portion 51 and the air supply connection portion 52 can be connected to the vehicle 1 only by a one-action operation of connecting the connector 50 to the vehicle 1.

When the connector 50 is connected to the terminal 20, the power supply device 40 starts charging in response to a predetermined operation (for example, an operation of an operation lever provided in the connector 50). Specifically, the electric power supply unit 41 supplies electric power supplied from the commercial electric power source to the charging unit 32 via the cable 44 and the connector 50 under the control of the control unit 42. The charging unit 32 performs a charging operation of supplying a charging current to the battery 33 according to the control of the control unit 31.

In addition, for example, when the connector 50 is connected to the terminal 20 in a case where a command signal for increasing the vehicle height of the vehicle 1 is input, the control unit 31 controls so as to supply compressed air to the air spring 12 from the compressor 43 via the connector 50. Specifically, the control unit 31 energizes the solenoid S1 of the on-off control valve 34 so that the first port P1 and the second port P2 communicate with each other. As a result, compressed air is supplied from the compressor 43 to the air spring 12. Then, the air chamber A expands, the air spring 12 and the damper 11 extend, and the distance between the vehicle body B and the wheel W increases. In this way, the vehicle height of the vehicle 1 can be made higher than the state before compressed air is supplied.

After the supply of the compressed air to the air chamber A is completed, the connection between the terminal 20 and the connector 50 is released. At this time, since the terminal 20 has the check valve 21, the compressed air in the air chamber A is prevented from spouting to the outside.

When the vehicle height of the vehicle 1 is to be lowered (for example, when a command signal for lowering the vehicle height of the vehicle 1 is input), the solenoid S2 of the on-off control valve 34 is energized so that the first port P1 and the third port P3 communicate with each other. As a result, the compressed air is discharged from the air spring 12 to the outside. Then, the air chamber A contracts, the air spring 12 and the damper 11 contract, and the distance between the vehicle body B and the wheel W decreases. In this manner, the vehicle height of the vehicle 1 can be made lower than the state before the compressed air is discharged.

As described above, the connector 50 of the first embodiment includes the charging connection portion 51 which supplies electric power to the vehicle 1, and can supply electric power supplied from the electric power supply unit 41 to the vehicle 1 by being connected to the vehicle 1. In addition, the connector 50 includes the air supply connection portion 52 which supplies compressed air to the air suspension device 10 which is provided in the vehicle 1 and to which the compressed air is supplied. Therefore, the connector 50 can supply compressed air to the air suspension device 10 by being connected to the vehicle 1. As described above, by connecting the connector 50 to the vehicle 1, it is possible to supply electric power to the vehicle 1 and also supply compressed air to the air suspension device 10.

Therefore, the connector 50 of the first embodiment can supply compressed air to the air suspension device 10 while supplying electric power to the vehicle 1.

In the connector 50 of the first embodiment, the charging connection portion 51 and the air supply connection portion 52 are simultaneously connected to the vehicle 1. Thus, since the charging connection portion 51 and the air supply connection portion 52 can be simultaneously connected to the vehicle 1 only by a one-action operation of connecting the connector 50 to the vehicle 1, operability is excellent.

The power supply device 40 of the first embodiment includes the connector 50, the electric power supply unit 41, and the compressor 43 which supplies compressed air to the air suspension device 10 via the air supply connection portion 52. The power supply device 40 supplies electric power from the electric power supply unit 41 to the vehicle 1 via the connector 50. Thus, since the power supply device 40 includes the compressor 43, it is possible to supply electric power and supply compressed air using the same power supply device 40, and the configuration can be simplified.

Second Embodiment

Next, a connector according to a second embodiment will be described. In a connector 250 according to the second embodiment, substantially the same components as those of the connector of the first embodiment are denoted by the same reference signs, and the description of the structure, operation, and effect will be omitted. The second embodiment is different from the first embodiment in the configuration of the connector.

Figure 4:
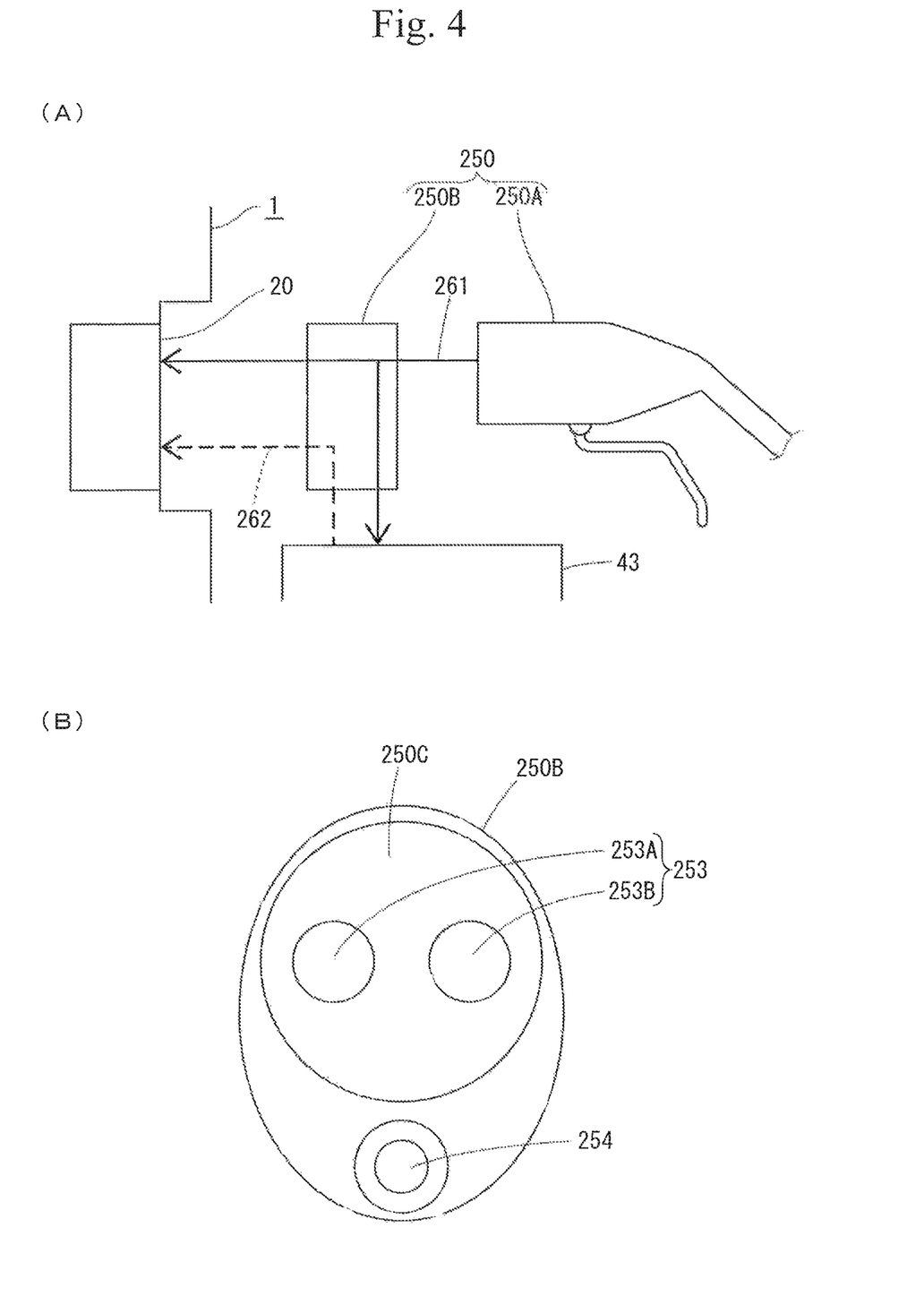
FIG. 4(A) is an explanatory diagram for explaining an electric power supply path and an air supply path in a state where a connector according to a second embodiment is connected to a vehicle.
FIG. 4(B) is a schematic diagram illustrating a connection face of the connector according to the second embodiment.

As illustrated in FIG. 4, the connector 250 of the second embodiment includes a connector main body 250A and an adapter 250B. The connector main body 250A is configured to be fitted to the adapter 250B. Similarly to the connector 50 of the first embodiment, the connector main body 250A is connected to the distal end of the cable 44 and detachably locked to the terminal 20 of the vehicle 1. In addition, the connector main body 250A includes a charging connection portion (not illustrated) having the same configuration as the charging connection portion 51 of the first embodiment.

As illustrated in FIG. 4(A), the adapter 250B is configured to be connected to the connector main body 250A and the vehicle 1. As illustrated in FIG. 4(B), the adapter 250B includes a charging connection portion 253 and an air supply connection portion 254. The charging connection portion 253 has the same configuration as the charging connection portion 51 of the first embodiment, and includes a pair of electrodes 253A and 253B electrically connected to a pair of electrodes (not illustrated) constituting the charging connection portion of the connector main body 250A. The air supply connection portion 254 is an opening for supplying compressed air to the air suspension device 10, and is connected to the compressor 43. The adapter 250B is connected to the compressor 43, and is configured to supply the compressed air supplied from the compressor 43 to the air suspension device 10 via the air supply connection portion 254. In addition, the adapter 250B is configured to supply the electric power supplied from the electric power supply unit 41 via the connector main body 250A, to the compressor 43.

The charging connection portion 253 and the air supply connection portion 254 are formed on the connection face 250C of the connector 250 (a face facing the vehicle 1 when the connector 250 is connected to the terminal 20 of the vehicle 1) at substantially the same position in the connecting direction (a direction in which the terminal 20 and the connector 250 face each other).

With such a configuration, when the connector 250 (a unit in a state where the connector main body 250A is fitted to the adapter 250B) is connected to the terminal 20 of the vehicle 1, the electric power supply unit 41 (see FIG. 1) is electrically connected to the charging unit. 32 via the charging connection portion (not illustrated) of the connector main body 250A and the charging connection portion 253 of the adapter 250B, so that an electric power supply path 261 connecting the electric power supply unit 41 and the charging unit 32 is formed. Further, via the air supply connection portion 254, communication between the compressor 43 and the air suspension device 10 is secured, so that an air supply path 262 connecting the compressor 43 and the air suspension device 10 is formed.

As described above, the connector 250 of the second embodiment includes the connector main body 250A to which electric power is supplied from the electric power supply unit 41, and the adapter 250B to be connected to the connector main body 250A and the vehicle 1 and having the charging connection portion 253 and the air supply connection portion 254. The adapter 250B is connected to the compressor 43, and supplies the compressed air supplied from the compressor 43 to the air suspension device 10 via the air supply connection portion 254. Thus, since the adapter 250B has the charging connection portion 253, the electric power supplied from the electric power supply unit 41 via the connector main body 250A can be supplied to the vehicle 1 when the adapter 250B is connected to the connector main body 250A. Further, since the adapter 250B has the air supply connection portion 254 and is connected to the compressor 43, the compressed air supplied from the compressor 43 can be supplied to the air suspension device 10 via the air supply connection portion 254. With this configuration, even if the connector main body 250A has a standardized arrangement of the charging connection portion and the like, it is possible to supply compressed air to the air suspension device 10 while supplying electric power to the vehicle 1 by connecting the connector main body 250A to the vehicle 1 as the connector 250 including the adapter 250B.

Third Embodiment

Next, a connector according to a third embodiment will be described. In a connector 350 according to the third embodiment, substantially the same components as those of the connector of the first embodiment are denoted by the same reference signs, and the description of the structure, operation, and effect will be omitted. The third embodiment is different from the first embodiment in the configuration of the connector.

Figure 5:
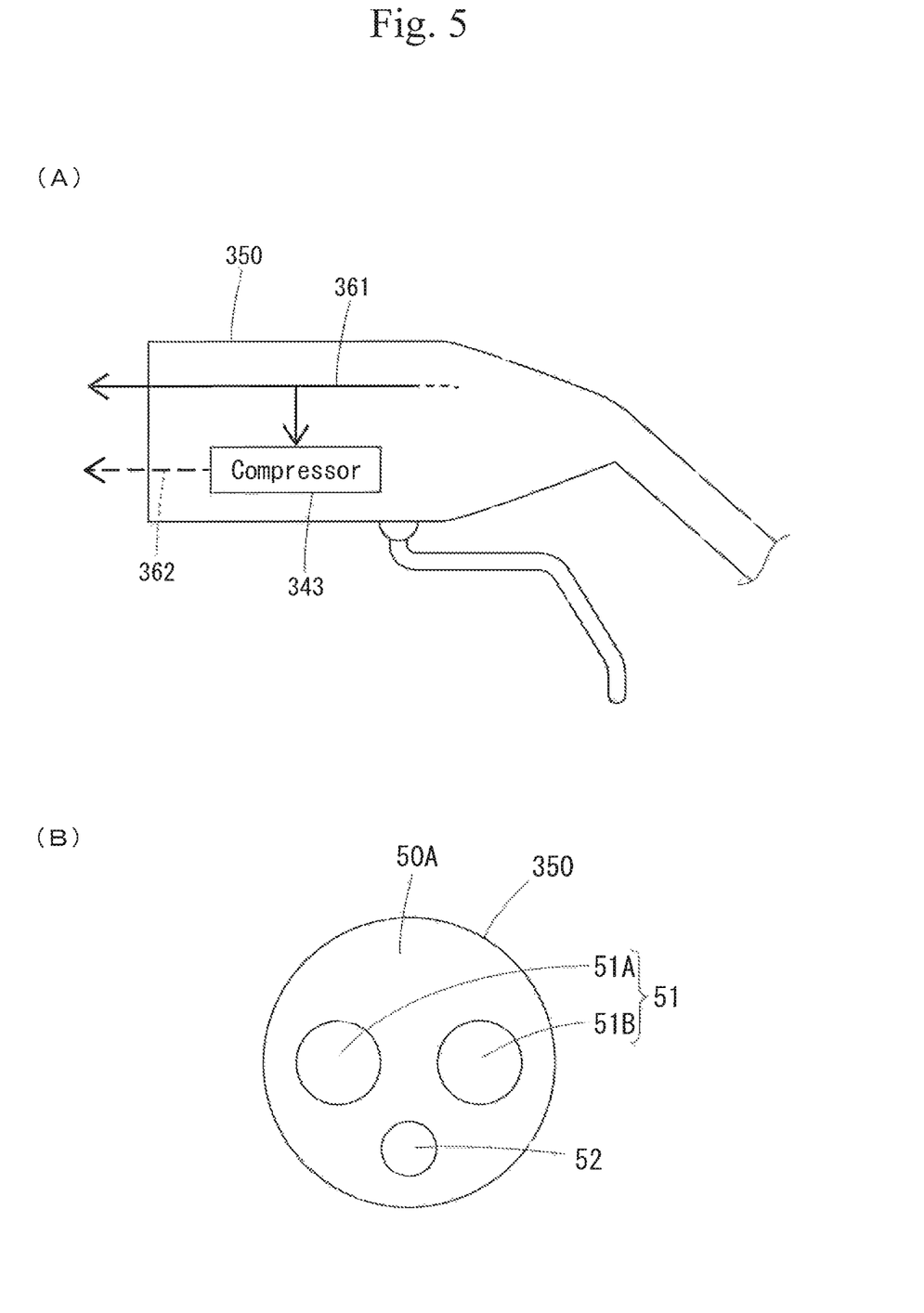
FIG. 5(A) is an explanatory diagram for explaining a connector according to a third embodiment.
FIG. 5(B) is a schematic diagram illustrating a connection face of the connector according to the third embodiment.

As illustrated in FIG. 5, the connector 350 of the third embodiment includes the charging connection portion 51 and the air supply connection portion 52 as in the first embodiment. A compressor 343 is incorporated in the connector 350. The connector 350 is connected to the terminal 20 of the vehicle 1, and the electric power supply unit 41 is connected to the charging unit 32 via the charging connection portion 51, so that an electric power supply path 361 is formed. The electric power supply path 361 branches to supply electric power also to the compressor 343. The air supply connection portion 52 communicates with the air suspension device 10, so that an air supply path 362 connecting the compressor 343 and the air suspension device 10 is formed.

As described above, the connector 350 of the third embodiment incorporates the compressor 343 which supplies compressed air to the air suspension device 10 via the air supply connection portion 52. Thus, since the compressor 343 is incorporated in the connector 350, it is not necessary to separately prepare an independent compressor when the connector 350 is used, and thus operability can be improved.

The present invention is not limited to the first embodiment to the third embodiment described with reference to the above description and drawings, and for example, the following embodiments are also included in the technical scope of the present invention.

(1) In the first embodiment to the third embodiment, the air suspension device has been exemplified as a pneumatic apparatus, but the pneumatic apparatus according to the present invention is not limited thereto, and may be another pneumatic apparatus. The pneumatic apparatus according to the present invention is intended to broadly include, for example, those which use compressed air, such as a tire which is simply filled with compressed air.

(2) In the first embodiment to the third embodiment, the form in which the vehicle includes the air suspension device as a pneumatic apparatus and the air suspension device has the vehicle height adjustment function has been exemplified. However, even when the vehicle includes the air suspension device, the air suspension device does not necessarily have the vehicle height adjustment function.

(3) In the first embodiment to the third embodiment, the charging connection portion and the air supply connection portion are formed on the connection face 50A of the connector 50 at substantially the same position in the connecting direction, but may be formed at shifted positions.

(4) In the first embodiment, the power supply device 40 includes the compressor 43, but the compressor 43 may be provided separately from the power supply device 40.

(5) In the first embodiment to the third embodiment, the electric vehicle having the battery unit has been exemplified as a vehicle, but the vehicle according to the present invention is not limited thereto. For example, the vehicle may be another form of electric vehicle such as a fuel cell vehicle.

REFERENCE SIGNS LIST

1 Vehicle
10 Air suspension device

40 Power supply device
41 Electric power supply unit
43, 343 Compressor
50, 250, 350 Connector
51, 253 Charging connection portion
52, 254 Air supply connection portion
250A Connector main body
250B Adapter

The invention claimed is:

1. A connector that is connectable to an electric vehicle including a pneumatic apparatus to which compressed air is supplied and that supplies electric power supplied from an electric power supply unit to the electric vehicle, the connector comprising:
   a charging connection portion that supplies electric power to the electric vehicle;
   an air supply connection portion that supplies compressed air to the pneumatic apparatus;
   a connector main body to which electric power is supplied from the electric power supply unit; and
   an adapter connected to the connector main body and the electric vehicle and having the charging connection portion and the air supply connection portion, wherein
   the adapter is connected to a compressor, and supplies compressed air supplied from the compressor to the pneumatic apparatus via the air supply connection portion, and
   the adapter is directly connected to the compressor such that compressed air from the compressor is supplied to the pneumatic apparatus through the adapter and not through the connector main body.

2. The connector according to claim 1, wherein the charging connection portion and the air supply connection portion are simultaneously connected to the electric vehicle.

3. The connector according to claim 2, wherein the adapter supplies electric power supplied from the electric power supply unit via the connector main body to the compressor.

4. A power supply device comprising:
   the connector according to claim 3; and
   the electric power supply unit, wherein
   the power supply device supplies electric power from the electric power supply unit to the electric vehicle via the connector.

5. A power supply device comprising:
   the connector according to claim 2; and
   the electric power supply unit, wherein
   the power supply device supplies electric power from the electric power supply unit to the electric vehicle via the connector.

6. The connector according to claim 1, wherein the adapter supplies electric power supplied from the electric power supply unit via the connector main body to the compressor.

7. A power supply device comprising:
   the connector according to claim 6; and
   the electric power supply unit, wherein
   the power supply device supplies electric power from the electric power supply unit to the electric vehicle via the connector.

8. A power supply device comprising:
   the connector according to claim 2; and
   the electric power supply unit, wherein
   the power supply device supplies electric power from the electric power supply unit to the electric vehicle via the connector.

9. A power supply device comprising:
   the connector according to claim 1;
   the electric power supply unit; and
   the compressor that supplies compressed air to the pneumatic apparatus via the air supply connection portion, wherein
   the power supply device supplies electric power from the electric power supply unit to the electric vehicle via the connector.

10. A connector that is connected to an electric vehicle including a pneumatic apparatus to which compressed air is supplied and that supplies electric power supplied from an electric power supply unit to the electric vehicle, the connector comprising:
    a charging connection portion that supplies electric power to the electric vehicle;
    an air supply connection portion that supplies compressed air to the pneumatic apparatus, and the connector further comprising:
    a connector main body to which electric power is supplied from the electric power supply unit; and
    an adapter connected to the connector main body and the electric vehicle and having the charging connection portion and the air supply connection portion, and
    wherein the adapter is connected to a compressor, and supplies compressed air supplied from the compressor to the pneumatic apparatus via the air supply connection portion, and
    wherein the adapter supplies electric power supplied from the electric power supply unit via the connector main body to the compressor.

11. A power supply device comprising:
    the connector according to claim 10; and
    the electric power supply unit, wherein
    the power supply device supplies electric power from the electric power supply unit to the electric vehicle via the connector.

* * * * *